US005294675A

United States Patent [19]

Forster et al.

[11] Patent Number: 5,294,675

[45] Date of Patent: Mar. 15, 1994

[54] FUNCTIONALIZED POLYMERS

[75] Inventors: Denis Forster, Ladue; Samuel J. Tremont, Manchester; Martin P. McGrath, Maryland Heights; Erik D. Sall, Chesterfield, all of Mo.

[73] Assignee: Monsanto Company, St. Louis, Mo.

[21] Appl. No.: 43,965

[22] Filed: Apr. 12, 1993

Related U.S. Application Data

[62] Division of Ser. No. 663,998, Mar. 4, 1991, Pat. No. 5,232,989.

[51] Int. Cl.[5] .......... C08F 8/00

[52] U.S. Cl. .......... 525/292; 525/301; 525/304; 525/331.7; 525/332.1; 525/337.8; 525/333.7; 525/359.4; 525/386

[58] Field of Search .......... 525/292, 301, 304, 359.4, 525/386

[56] References Cited

U.S. PATENT DOCUMENTS

| | | | |
|---|---|---|---|
| 2,839,478 | 6/1958 | Wilms et al. . | |
| 2,904,532 | 9/1959 | Wilms et al. . | |
| 3,040,002 | 6/1962 | Aldridge . | |
| 3,112,984 | 12/1963 | Aldridge . | |
| 3,383,426 | 5/1968 | Cull et al. | 260/635 |
| 4,144,215 | 3/1979 | Khachaturian . | |
| 4,276,394 | 6/1981 | Kennedy et al. | 525/245 |
| 4,316,973 | 2/1980 | Kennedy | 525/335 |
| 4,342,849 | 8/1982 | Kennedy | 525/333.7 |
| 4,871,878 | 10/1989 | Puckett et al. | 568/454 |
| 4,960,949 | 10/1990 | Devon et al. | 568/454 |
| 4,962,237 | 10/1990 | Laycock | 568/618 |
| 4,970,018 | 11/1990 | Lunney | 252/182.25 |

OTHER PUBLICATIONS

J. P. Kennedy, Chemtech., Nov., (1986), pp. 694–697.

Kennedy et al., *Adv. Urethane Science Technology,* Polymer Bulletin, Polyisobutylene-Based Diols and Polyurethanes, (1981), 8, pp. 245-251.

Schneider et al., Adv. Urethane Science Technology, Polymer Bulletin, Structure and Properties of Polybutadiene Polyurethanes, (1981), 8, pp. 49-74.

Mohammadi, N. A. et al., "Chemical Modification of Diene Polymers Via Homogeneous Hydrogenation and Hydroformylation", *Polymer Preprints,* 27, pp. 95-96 (1986).

*Primary Examiner*—Bernard Lipman

[57] ABSTRACT

Functionalized polymers manifesting exceptional stress-strain properties are prepared from polyols having terminal and nonterminal hydroxyl groups.

21 Claims, No Drawings

FUNCTIONALIZED POLYMERS

This is a division of application Ser. No. 07/663,998, filed Mar. 4, 1991, now U.S. Pat. No. 5,232,989.

BACKGROUND OF THE INVENTION

1. Field of the Invention

The present invention relates to functionalized polymers and, more particularly, to polyurethanes, polyesters and polycarbonates derived from polyols which include both terminal and nonterminal hydroxyl groups.

2. Related Art

It is well known in the art to convert olefins to aldehydes having one additional carbon atom by contacting a $C_2$ to $C_{20}$ monoolefin or a $C_5$ to $C_{5000}$ nonconjugated polyolefin with hydrogen and carbon monoxide in the presence of a catalyst based on cobalt or rhodium metal. See, for example, U.S. Pat. No. 4,871,878.

It is also known, as disclosed in U.S. Pat. No. 3,383,426, to hydroformylate polymers utilizing hydrocarbon-soluble phosphine and phosphite catalyst complexes which include a Group VIII transition metal and at least one ligand consisting of a carbon monoxide molecule.

It is also known in the art to prepare polyurethane block polymers by condensing diisocyanates with polyols which have $-CH_2OH$ terminal groups attached to the polymer by way of initiator-transfer agents through dehydrochloration, hydroboration and oxidation steps. Thus, this process involves creating additional unsaturation in the polymer to be functionalized rather than taking advantage of existing unsaturation. See, for example, J. P. Kennedy, Chemtech, Nov., 694 (1986).

Polyols which are presently utilized in the industry to prepare polyurethanes, polycarbonates and polyethers are predominantly polyether and polyester polyols. Such polyols are generated by ethylene oxide and propylene oxide oligomerization reactions, typically utilizing adipic acid. Such polyols therefore contain only terminal hydroxyl groups. None of the polyols presently utilized to prepare polyurethanes have nonterminal $-CH_2OH$ groups and therefore have limited functional density.

SUMMARY OF THE INVENTION

The present invention is directed to functionalized polymers characterized by having nonterminal functional groups. As a result, the polymers of the present invention manifest significantly increased stress-strain properties when compared to the prior art polymers.

The present invention is also directed to a method for preparing polyurethanes, polycarbonates and polyesters from reduced aldehyde-functionalized polyners. The aldehyde functionalized polymers are prepared taking advantage of unsaturation already existing in the polymer, i.e., beginning with an olefinic polymer. Such aldehyde-functionalized polymers preferably are prepared by a process comprising mixing an olefinic polymer with hydrogen and carbon monoxide in the presence of a Rhodium I catalyst. Preferably, the olefinic polymer has a weight average molecular weight (Mw) of at least 100 and is selected from the group consisting of olefinic homopolymers and copolymers, and copolymers of olefins and at least one copolymerizable nonolefinic monomer.

The Rhodium I catalysts suitable for use in the present invention are utilized at levels of less than 200 parts of catalyst based on metal rhodium per $10^6$ parts of polymer. Thus, the present process can be conducted economically, i.e., at low catalyst cost, and at relatively mild conditions.

The resulting aldehyde-functionalized polymers are then reduced to produce the corresponding polyol characterized by having, per polymer molecule, at least one repeat unit of the formula:

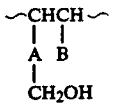

wherein A is absent, i.e., where the $-CH_2OH$ group is directly attached to the polymer backbone derived from an unsaturated portion thereof, or represents a radical derived from a pendant unsaturated hydrocarbon portion of a monomer of the polymer molecule which pendant portion has from 1 to about 8 carbon atoms; and B represents hydrogen or, together with A represents a radical derived from a pendant portion of an unsaturated monocyclic, bicyclic or tricyclic hydrocarbon monomer of the polymer molecule and having from about 5 to about 22 carbon atoms. Preferably, A represents a radical derived from a pendant unsaturated portion of a butadiene radical or together with B represents a radical derived from dicyclopentadiene, 5-isopropylidene-2-norbornene, or 5-ethylidenenorborene. The polyol is then reacted with 1) a diisocyanate to produce the corresponding polyurethane; 2) a disubstituted carbonate to produce the corresponding polycarbonate; or 3) a dicarboxylic acid or derivative thereof to produce the corresponding polyester.

DETAILED DESCRIPTION OF THE INVENTION

As utilized herein, the term "nonterminal" refers to a portion of the polymer backbone other than the terminal ends, f or example, where a $-CH_2OH$ group is attached to the polymer backbone at a point within the terminal ends thereof or where a $-CH_2OH$ group is attached to a radical derived from a pendant unsaturated monomer portion of the polymer molecule within the terminal ends thereof.

A. Hydroformylation

In accordance with the present invention, the polyurethanes and polycarbonates of the present invention are prepared from aldehyde-functionalized polymers which include both terminal and nonterminal aldehyde groups. These aldehyde-functionalized polymers are prepared taking advantage of unsaturation already existing in the polymer.

A preferred method for preparing aldehyde-functionalized polymers useful in preparing the polyol-derived functional polymers of the present invention comprises mixing an olefinic polymer having a weight average molecular weight of at least about 1000 with less than 20 parts of a ligand-modified Rhodium I catalyst per $10^6$ parts polymer, and then reacting the resulting mixture with hydrogen and carbon monoxide at a temperature of from about 50°-150° C., preferably, 80°-130° C., such as at 100° C., and a total pressure of from 100 psig-2000 psig, preferably, 500-1500 psig, such as 1000 psig. Another method for preparing aldehyde-functionalized polymers which include terminal and nonterminal functional groups is disclosed in U.S. Pat. No. 3,383,426 and involves hydroformylating a polymer utilizing carbon monoxide and hydrogen in the presence of a phosphine or phosphite catalyst.

Olefinic polymers useful in the process of the present invention are those prepared from monomers represented by the formula $CH_2{=}CHR$ wherein R represents hydrogen and alkyl radicals having from 1 to about 12 carbon atoms which alkyl radicals may be unsaturated, e.g., where the monomer is a diene. Examples of such monomers include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 3-methyl-1-hexene, 1,4-ethyl-1-hexene, 1,4-butadiene and the like.

Preferred polyolefins include homopolymers such as polyethylene, polypropylene, polybutylene, polybutadiene, polyoctene; copolymers of olefins such as poly-(ethylene propylene), poly(ethylene octene), poly(ethylene isobutylene), poly(ethylene-1-butene), poly(ethylene-hexene), poly(propylene octene); copolymers of olefins and at least one copolymerizable monoolefinic monomer such as poly(ethylene propylene diene monomer), poly(ethylene vinyl acetate), poly(ethylene vinyl alcohol), poly(ethylene ethyl acrylate), poly(propylene methyl acrylate), copolymers of dienes and acrylonitrile such as a copolymer of butadiene and acrylonitrile; and the like.

Especially preferred polyolefins include homopolymers of ethylene, propylene and butadiene; copolymers of ethylene and propylene; copolymers of ethylene and octene, e.g., linear low density polyethylene; copolymers of ethylene and vinyl acetate; copolymers of ethyl and vinyl alcohol which may also contain residual acetate groups; and copolymers of two or more olefins and a diene monomer such as poly(ethylene propylene diene monomer) EPDM. Satisfactory diene monomers include straight chain (acyclic) dienes such as 1,4-hexadiene, 2-methyl-2,4-pentadiene, 1,4,9 decatriene and ii-ethyl-1,11-tridecadiene; monocyclic dienes such as 1,5-cyclooctadiene, dienes such as 5-ethylidenenorborene (ENB), 5-methylene-2-norbornene; 5-isopropylidene-2-norbornene and 2-methyl-bicyclo-(2.2.1)-2,5-heptadiene; fused ring bicyclics such as bicyclo (4.3.0)-3,7-nonadiene; 5-methyl-bicyclo(4.3.0)-3-7-nonadiene; 5,6-dimethyl-bicyclo-(4.3.0)-3,7-nonadiene and bicyclo(3.2.0)-2,6-heptadiene; alkenyl substituted monocyclics such as 4-vinyl-cyclohexene; 1,2-divinylcyclobutane and 1,2,4-trivinylcyclohexane; and tricyclics such as dicyclopentadiene (DCPD). Grades of EPDM rubbers suitable for use in the practice of the invention are commercially available; Rubber World Blue Book 1975 Edition, *Materials and Compounding Ingredients for Rubber*, pages 406–410. Preferred EPDM rubbers are those marketed by Uniroyal Chemical Company, Inc., Middlebury, Conn. under the tradename Trilene®, such as Trilene® 66 and 67 (ENB diene monomers), Trilenee® 55 and 65 (DCPD diene monomer) and the like. Other preferred EPDM rubbers include those wherein the diene monomer is 5-isopropylidene-2-norbornene. Although not specifically required, the ethylene to propylene ratio in such EPDM rubbers is preferably within a range of from about 40/60 to about 50/50.

In order to undergo the hydroformylation reaction the polyolefin used in the present invention must contain a level of unsaturation, i.e., as carbon to carbon double bond, which is the site where the syngas will form the aldehyde (—CHO) group. This unsaturation can be present in the backbone of the polymer or in a pendant group thereof, e.g., as in EPDM materials. Preferably the level of unsaturation in the polyolefin will be in the range of from one C=C per polymer chain (or molecule) up to about one C=C per 4 carbon atoms. Procedures for determining the level of unsaturation of polymers are well known. For example, the level of unsaturation can be determined utilizing ASTM D-1638-59T. The level of unsaturation can also be determined utilizing infrared spectroscopy or $^1H$ nmr. This method can be conducted according to well-known procedures as described in Willard et al, *Instrumental Methods of Analysis*, Chapters 5 and 6, Van Nostrand Co., Inc., Publishers (1965). Alternatively, well-known titration methods can also be utilized. A preferred method for determining unsaturation levels is $^1H$ nmr.

Suitable olefinic polymers have a weight average molecular weight (Mw) of from about 1000 to about 250,000. Preferred olefinic polymers are those having a Mw of from 600 to about 150,000, most preferably from 900 to about 7,000.

The olefinic polymer is mixed with carbon monoxide and hydrogen, with the polymer in the melt phase or dissolved in an inert solvent. Where no solvent is utilized, the polymer is heated to the Tg value corresponding to the specific polymer and then the carbon monoxide and hydrogen are added thereto and mixed. where an inert solvent is utilized, the polymer is dissolved in the solvent and then the carbon monoxide and hydrogen are added and mixed. Suitable inert solvents for dissolving the polymer include toluene.

The hydrogen and carbon monoxide are mixed with the polymer in a $H_2/CO$ molar ratio of f rom about 1:3 to about 3:1, preferably from about 1:2 to about 2:1. A most preferred ratio is 1:1. Throughout the course of the reaction, the presence of $H_2$ and Co is preferably essentially maintained at the initial molar ratio.

Following addition of carbon monoxide and hydrogen, a suitable catalyst is added to the mixture. Alternatively, the catalyst can be mixed with the polymer prior to addition of the hydrogen and carbon monoxide. Suitable catalysts for hydroformylating the olefinic polymer include dicarbonyl acetylacetonate Rhodium I ($Rh(CO)_2AcAc$), cyclooctadiene trifluoracetyl Rhodium I dimer ($[Rh(cod)(O_2CCF_3)I)_2$, $RhH(CO)(PPh_3)_3$. A preferred catalyst is $Rh(CO)_2AcAc$.

The components of the mixture are then reacted, at a temperature of from about 50° C. to about 225° C. and at a pressure greater than about 2.0 mpa, to produce the aldehyde-functionalized polymers.

In the following examples, the EPDM and polybutadiene polymers utilized were purchased. The rhodium hydroformylation catalysts were either purchased or prepared according to known literature procedures. Thus, $Rh(CO)_2$ (acetylacetonate) and $RhH(CO)(PPh_3)$ were purchased from Strem Chemicals, Inc., Newburyport, Mass. 01950. ($Rh(cod)(O_2CCF_3)$) was synthesized according to the following procedure. [Rh(1,5-cyclooctadiene)C1]$_2$ (made from $RhCL_3$. $3H_2O$ [Englehard Industries, Inc., Newark, N.J.] using the preparation described by G. Giordano and R. H. Crabtree found in *Inorg. Synth.*, Vol. 19, 218–220) (0.370 gm, 0.751 mmol) was placed in a Schlenk tube under Ar atmosphere and dissolved in 25 mL of degassed, dry toluene. $AgO_2CCF3$ (0.376 gm, 2.3 equiv.) was added to the bright yellow solution and allowed to stir for 2 hours. The solution was then filtered through diatomaceous earth to give a clear, bright yellow solution. The toluene solvent was then removed in vacuo. The yellow solids were then recrystallized by dissolving in 5 mL of $CH_2Cl_2$ and then adding 5 mL of hexanes. The $CH_2Cl_2$ was removed in vacuo and the remaining hexane solution was cooled to $-78°$ C. in a dry ice/acetone bath to yield a fine yellow powder of the desired product. The bright yellow solid was isolated by filtration and dried in vacuo. The product was then recrystallized a second time by dissolving in $CH_2Cl_2$ and crystallizing from hexanes as before. The product was then characterized by $^1H$ nmr and FTIR. Likewise, the ruthenium hydrogenation catalysts were either purchased or prepared according to known literature procedures. Thus, $RuHCl(CO)(P(C_6H_{11})_3)_2$ was prepared according to the procedure set forth in Moers et al, Recueil, 91, 591-600 (1972). $RuCl_2(CO)_2(PPh_3)_2$ was purchased from Strem Chemicals.

Example 1

Solution Hydroformylation

In this method a 2-liter autoclave was charged with a specified amount of EPDM polymer (Nordel 1440 EPDM Hydrocarbon purchased from E. I. dupont de Nemours; diene monomer, 1,4-hexadiene; Mw of 290,000; Mooney viscosity of 40; 0.86 specific gravity; 55/39/6.2 Ethylene/Propylene/Diene Monomer weight percent) in solution in toluene and an effective amount of a soluble, ligand-modified metal complex catalyst. The autoclave was pressurized to 1500 psig with $CO/H_2$ and heated to 100° C. The reaction was continued while maintaining a flow of $CO/H_2$ to the system to maintain a $CO/H_2$ molar ratio of about 1:1 and maintain a constant autoclave pressure.

After specified periods of time, the reaction was stopped by venting off the gas and cooling the solution to 28° C. A representative portion of the reaction solution was removed and the polymer contained therein precipitated with methanol. The polymer was then analyzed by IR and $^1H$ NMR for aldehyde functional groups. The runs were continued by again pressurizing the autoclave to 1500 psig with $CO/H_2$ and heating to 100° C. for additional intervals.

In Example 1, a 10 ppm level of dicarbonyl acetylacetonate Rhodium I was used to hydroformylate an EPDM polymer in solution.

The autoclave was charged with:

10 grams of EPDM polymer dissolved in 120 cc toluene, and, 0.1 mg of $Rh(CO)_2AcAc$ and the solution processed in accordance with the procedure set forth above. The reaction was interrupted at 4.5, 12.0 and 20.0 hours and representative samples analyzed by IR and $H^1$ NMR. The results are tabulated in Table 1.

TABLE 1

SUMMARY OF EXAMPLE 1

| Example | EPDM (G)/ 120 cc toluene | Weight (mg) $Rh(CO)_2AcAc$ | Conc.* | Time (hrs) | Results IR | Results $H^1$ NMR |
|---|---|---|---|---|---|---|
| Control | 10 | 0 | 0 | 15.0 | IR shows no aldehyde peak. | H NMR showed no aldehyde. |
| (1) | 10 | 0.1 | 10 ppm | 4.5 | IR indicates aldehyde groups to be present. | H NMR indicates aldehyde groups to be present. |
| | | | | 12.0 | IR analysis indicates more aldehyde groups were produced. | |
| | | | | 20.0 | IR indicated aldehyde by the band at 1732. | $H^1$ NMR indicated aldehyde production. |

*Concentration of catalyst to polymer.

Example 1 demonstrates that successful solution hydroformylation of an EPDM polymer occurs at catalytic levels as low as 10 ppm.

EXAMPLE 2

A toluene solution of EPDM (Ethylene-Propylene-Diene Monomer) polymer was made by dissolving 300.05 gm of EPDM polymer (Trilene® 55 obtained from Uniroyal Chemical Co., Middlebury, Conn.; Ethylene/Propylene 48/52; diene monomerdicyclopentadiene; Mu-6500, and Brookfield viscosity @100° C. of 67,000) in 500 mL of toluene and then degassing the solution by bubbling with argon. In a separate flask, Rh(acac) $(CO)_2$ (75.3mg, 0292 mmol) (acac=acetylacetonate) was dissolved in 100 mL of toluene and the solution was degassed by bubbling with argon. Both solutions were placed in a 2L reactor. The solutions were degassed with nitrogen three times in the reactor and then heated to 100° C. under 5 psig of nitrogen. The reactor was then charged to 1000 psig with 1:1 $H_2/CO$. The extent of reaction was measured by gas uptake from a calibrated reservoir. In this way the amount of aldehyde groups placed on the polymer backbone could be measured and controlled. At the desired functionality level, the reaction was stopped by quickly cooling the reactor and venting the $H_2/CO$ gas from the reactor. The polymer solution was then removed from the reactor. The amount of toluene solvent was reduced by rotary evaporation and the hydroformylated polymer was precipitated from the toluene solution by slow addition of reethanol (500 mL) with stirring. The solvents were then decanted and the polymer redissolved with 500 mL of toluene and precipitated again with 500 mL of methanol. After decanting the solvents, residual methanol was removed from the polymer by rotary evaporation leaving a light amber toluene solution of purified polyaldehyde. The extent of functionalization could be determined by comparing the integrals for the aldehyde groups and the residual olefin groups on the polymer in the $^1H$ nmr.

EXAMPLE 3

The EPDM(53.5 gm) utilized in Example 2 was dissolved in 90 mL of toluene was placed in a 300 mL stainless steel reactor. A solution comprised of Rh(acac)$(CO)_2$(5.7 mg, 22.09 μmol) and $RuCl_2(CO)_2(PPh_3)_2$ (50.7 mg, 67.37 μmol) dissolved in 20 mL of toluene was added to the reactor. The reactor was degassed three times with nitrogen and then heated to 150° C. under 5 psig of nitrogen. The reactor was then charged with 1000 psig of 1:1 $H_2$/CO. Gas uptake was measured from a calibrated reservoir. After 19.5 hours the reaction was stopped by cooling the reactor and venting the $H_2$/CO gas. The reaction mixture was removed from the reactor and $^1$H nmr revealed that 35.3 percent of the starting olefin groups had reacted to form aldehyde groups and 15.5 percent of the starting olefin had reacted to form alcohol groups. 49 percent of the starting olefin was unreacted.

EXAMPLE 4

EPDM-Polyaldehyde was produced using (Rh (cod)$(O_2CCF_3)]_2$(cod = 1, 5-cyclooctadiene) as the hydroformylation catalyst. The same procedure described in Example 1 was used except that (Rh(cod)$(O_2CCF_3)]_2$ was substituted for Rh(acac)$CO)_2$. When the same molar concentration of catalyst was used (based on Rh), [Rh(cod)$(O_2CCF_3)]_2$ was found to be just as effective a catalyst for hydroformylation as Rh(acac)$(CO)_2$.

EXAMPLES 5 TO 15

In Examples 5 to 15, hydroformylation of an EPDM polymer (Nordell 1440, described in Example 1) was performed according to the procedure set forth below under conditions which simulate the polymer in a melt phase. This procedure was performed utilizing dicarbonyl acetylacetonate Rhodium (I) and various levels of hydrocarbonyl tris(triphenyl phosphine) Rhodium (I).

Simulated Melt Phase Hydroformylation

In this method a stated amount of an EPDM (Nordell 1440) polymer and an effective amount of a specified catalyst were dissolved in toluene in a dry box. The solution was mixed well and the toluene removed by vacuum. A sample of the EPDM/catalyst was placed in a 30 cc Parr reactor in the dry box. The reactor was then heated to the stated temperature (150° C. to 215° C.) under a CO/H. pressure of 1000 psig. The reaction was continued while maintaining a flow of CO/$H_2$ to the system to maintain a CO/$H_2$ molar ratio of about 1:1 and a reactor pressure of about 1500 psig. Samples were removed at specified intervals and analyzed by IR and H NMR for aldehyde functional groups. The reaction conditions and results are set forth in Table 2.

TABLE 2

SUMMARY OF EXAMPLES 7 TO 17

| EXAMPLE | EPDM (g) | Catalyst/wt (g) | | Conc.* | Temp. (°C.) | CO/$H_2$ (psig) | Time (min.) | | |
|---|---|---|---|---|---|---|---|---|---|
| (5) | 0.10 | — | 0.00 | 0 | 150. | 1000. | 150. | IR shows no aldehyde peak. | |
| (6) | 1.00 | — | 0.00 | 0 | 150. | 1000. | 4275 | IR shows trace peak at 1738. | H NMR after 11709 transients showed no aldehyde. Olefin had isomerized. |
| (7) | 0.10 | A | 0.01 | 10 pph | 150. | 1000. | 150. | IR shows aldehyde peak at 1726 and acid peak at 1707. | |
| (8) | 0.10 | A | 0.01 | 10 pph | 150. | 1000. | 315. | IR shows aldehyde peak at 1730. | |
| (9) | 0.10 | A | 0.01 | 10 pph | 215. | 1000. | 125. | IR shows aldehyde peak at 1730. | |
| (10) | 0.10 | B | 0.01 | 10 pph | 150. | 1000. | 360. | IR shows aldehyde peak at 1730 also a peak at 1794 due to the catalyst. | |
| (11) | 1.00 | A | 0.01 | 1 pph | 150. | 1000. | 1110. | IR shows aldehyde peak at 1730. | H NMR shows no olefin. |
| (12) | 1.00 | A | 0.001 | 0.1 pph | 150. | 1000. | 1050. | IR shows aldehyde peak at 1732. | H NMR shows approx. 50% olefin. |
| (13) | 1.00 | A | 0.0001 | 100 ppm | 175. | 1000. | 1140. | IR shows aldehyde peak at 1732. | H NMR shows olefin and trace aldehyde. |
| (14) | 1.00 | A | 0.00001 | 10 ppm | 200. | 1000. | 1080. | IR shows trace aldehyde peak at 1732. | H NMR after 11294 transients showed trace aldehyde and <90% olefin. |
| (15) | 1.00 | A | 0.0001 | 1 ppm | 200. | 1000. | 4115. | IR shows trace peak at 1740. | H NMR after 11004 transients showed no aldehyde. Olefin has |

TABLE 2-continued

| SUMMARY OF EXAMPLES 7 TO 17 | | | | | | | |
|---|---|---|---|---|---|---|---|
| EXAMPLE | EPDM (g) | Catalyst/wt (g) | Conc.* | Temp. (°C.) | $CO/H_2$ (psig) | Time (min.) | |
| | | | | | | | isomerized. |

Catalyst A: hydrocarbonyl tris(triphenyl phosphine) Rhodium (I)
Catalyst B: dicarbonylacetyl acetonate Rhodium (I)
*Concentration of catalyst to polymer.

Examples 5 and 6 demonstrate that the presence of a catalyst is needed to initiate the hydroformylation reaction. Increased temperatures and extended reaction times do not result in the production of aldehyde-functionalized EPDM polymers in the absence of an appropriate catalyst.

Examples 7 through 9 show the successful hydroformylation of EPDM utilizing a 10 pph level of hydrocarbonyl tris(triphenyl phosphine) Rhodium (I). Higher temperatures result in lower reaction times.

Example 10 demonstrates the successful hydroformylation of EPDM utilizing a 10 pph level of dicarbonyl acetylacetonate Rhodium (I).

Examples 11 through 15 show the hydroformylation of EPDM utilizing levels of catalyst as low as 10 ppm. Example 14, in particular, demonstrates the hydroformylation of EPDM containing 10 ppm of hydrocarbonyl tris(triphenyl phosphine) Rhodium I at 200° C. and 1000 psig ($CO/H_2$ 1:1) in the absence of solvent.

EXAMPLE 16

A toluene solution of polybutadiene polymer (Aldrich Chemicals cat. no. 20050-6; Mn 4500, 45% vinyl, 55% cis and trans-1,4) was made by dissolving 350.70cjm of polybutadiene in 600 mL of toluene and then degassing the solution by bubbling with argon. In a separate flask, $Rh(acac)(CO)_2$ (27.0 mg, 0.105 mmol) (acac=acetylacetonate) was dissolved in 100 mL of toluene and the solution was degassed by bubbling with argon. Both solutions were placed in a 2L reactor. The solutions were degassed with nitrogen three times in the reactor and then heated to 100° C. under 5 psig of nitrogen. The reactor was then charged to 1000 psig with 1:1 $H_2/CO$. The extent of reaction was measured by gas uptake from a calibrated reservoir. In this way the amount of aldehyde groups placed on the polymer backbone could be measured and controlled. At the desired functionality level, the reaction was stopped by quickly cooling the reactor and venting the $H_2/CO$ gas from the reactor. The polymer solution was then removed from the reactor. The amount of toluene solvent was reduced by rotary evaporation and the hydroformylated polymer was precipitated from the toluene solution by slow addition of methanol (500 mL) with stirring. The solvents were then decanted and the polymer redissolved with 500 mL of toluene and precipitated again with 500 mL of methanol. After decanting the solvents, residual methanol was removed from the polymer by rotary evaporation leaving a light amber toluene solution of purified polyaldehyde. The extent of functionalization could be determined by comparing the integrals for the aldehyde groups and the residual olefin groups on the polymer in the $^1H$ NMR.

B. Polyol Preparation

The resulting aldehyde-containing polymers are freed of catalyst by precipitating the polymer from a nonpolar solvent, e.g., toluene, utilizing a polar solvent, e.g., methanol. The aldehyde functionalities are then reduced to the corresponding hydroxyl groups utilizing any one of several known suitable reducing agents such as, for example, sodium borohydride and the like. Alternatively, the aldehyde functionalities can be reduced utilizing hydrogen gas and a suitable hydrogenation catalyst, e.g., a ruthenium phosphine catalyst. Suitable hydrogenation catalysts include $RuCl_2(CO)_2(PPh_3)_2$ and $RuHCl(CO)(P(C_6H_{11})_3)_2$.

Following removal of the hydroformylation catalyst and conversion of the aldehyde groups to the corresponding hydroxyl group, the resulting polyols are condensed with 1) an appropriate diisocyanate to produce the corresponding polyurethane; 2) with an appropriate disubstituted carbonate to produce the corresponding polycarbonate; or 3) with an appropriate dicarboxylic acid, or derivative thereof, e.g., the corresponding acid chloride thereof, to produce the corresponding polyester.

EXAMPLE 17

A toluene solution of the polyaldehyde of Example 2 was reduced in volume on a rotary evaporator and then placed in a silylated 4L glass beaker. 500 mL of tetrahydrofuran and 60 mL of ethanol were added to the solution. For 0.153mol of aldehyde groups present in 710 the polymer solution, 2.17gm (l.Seq., 0.0574mol) of $NaBH_4$ were added slowly to the polymer solution. $NaBH_4$ allowed to react for 18 hours to ensure complete reaction. The reaction was then quenched with 70 mL of 1.2M HCI in MeOH. This was allowed to stir for 30 minutes and then the polymer was precipitated with 350 mL of MEOH. The solvents were decanted and 250 mL of tetrahydrofuran was added to redissolve the polymer. An additional 10 mL of 1.2M HCl in MEOH were added to the solution to quench any remaining $NaBH_4$. The polymer was then precipitated with 350 mL of MEOH and the solvents were decanted. The polymer was then poured into a container made from teflon coated foil and dried in a vacuum oven at 40° C. for 24 hours. The extent of functionalization could be determined by comparing the integrals for the alcohol groups and the residual olefin groups on the polymer in the $^1H$ nmr.

EXAMPLE 18

EPDM-Polyaldehyde was prepared in the same manner as described in Example 2 on a 50gm scale in a 300 mL reactor. Upon reaching the desired functionality level, the hydroformylation reaction was stopped by cooling the reactor and venting the $H_2/CO$. The reactor was then degassed with nitrogen three times. $RuHCl(CO)\ (P\ (C_6H_{11})_3)_2$(25 mg, 0.0344 mmol) dissolved in 10 mL of toluene was then injected into the reactor by syringe. The reactor was then heated to 150° C. under 5 psig of nitrogen. The reactor was then charged to 1000 psig with $H_2$ gas and allowed to react. Gas uptake was monitored from a calibrated reservoir. The reaction was stopped after two hours by cooling the reactor and venting the $H_2$ gas. $^1H$ nmr revealed that 91.8 percent of the aldehyde groups had been reduced to alcohol groups and the residual olefin, that had not been hydroformylated, was untouched by the Ru catalyst.

EXAMPLE 19

EPDM-Polyaldehyde was prepared in the same manner as described in Example 2. A 100 mL stainless steel reactor was charged with 5 gm of EPDM-Polyaldehyde and approximately 45 mL of toluene. The reactor was also charged with $RuCl_2(CO)_2(PPh_3)_2$)(2.2 mg, 2.92 μmol). The reactor was then flushed with argon three times. The solution was then heated to 150° C. under lopsig of argon. The reactor was charged to 300 psig with hydrogen and allowed to react. After 4.5 hours the reaction was stopped by cooling the reactor and venting the hydrogen gas. The reaction mixture was removed and 1H nmr revealed that 57 percent of the original aldehyde groups had been reduced to alcohol groups. The functionality on the material consisted of 35.8% alcohol groups, 62.4% aldehyde groups, and 1.8% residual olefin groups.

EXAMPLE 20

The orange-amber, toluene solution of polybutadiene aldehyde of Example 16 was concentrated by rotary evaporation and placed in a 2L beaker. To the polymer solution, 500 mL of tetrahydrofuran and 70 mL of ethanol were added. $NABH_4$ (3.2gm, 0.0846 mol, 1.45 equiv.) was added to the solution in portions. The solution immediately went from orange to bright yellow in color. The solution was left to stir overnight (18hrs). The reaction was then quenched by bringing the solution to acidity with 70 mL of 1M HCl in ethanol. The polymer was then precipitated from solution with 500 mL of methanol. After decanting the solvents, the polymer was redissolved with 500 mL of tetrahydrofuran. The polymer solution was then reacidified with 10 mL of 1M HCl in ethanol and the polymer was precipitated with 500 mL of methanol. After the solvents were decanted the polymer was redissolved in 500 mL of toluene and residual methanol was removed by rotary evaporation. To further remove salts, the polymer solution was centrifuged and the polymer solution was decanted from the salts. The polymer was then precipitated from solution with 500 mL of methanol and solvents were decanted off. The remainder of the solvents were removed in vacuo to yield the neat material.

C. Polyurethane Preparation

The polyurethanes of the present invention are prepared through stepwise polymerization (or step-reaction polymerization) to produce condensation polymers. The reaction can be represented by the following scheme:

$$XHOROH+YOCNR'CNO \rightarrow [OROC(O)NHR'NH-C(O)]_2$$

Preferred polyols for use in preparing polyurethanes of the present invention are the products of hydroformylated and reduced polybutadiene and EPDM materials which materials, prior to hydroformylation, have a weight average molecular weight (Mw) of from about 600 to about 250,000.

Suitable diisocyanates include 2,4-toluenediisocyanate, 4,41-benzidenediisocyanate, 1,5-naphthalene diisocyanate, diphenylmethane-diisocyanate and 4,4'-methylene bis(cyclohexylisocyanate). Preferred diisocyanates are diphenylmethane diisocyanate and 4,4'-methylene bis (cyclohexylisocyanate) both of which are commercially available from MoBay Chemical Company, Houston, Tex. The most preferred diisocyanate is 4,4'-methylene bis(cyclohexyl isocyanate).

The stepwise polymerization is conducted at a suitable temperature in an inert solvent and in the presence of a suitable catalyst. A preferred solvent is m-xylene. Suitable polymerization catalysts are well known in the art, e.g., dialkyltin dicarboxylates. A preferred catalyst is dibutyltin dilaurate which is commercially available from Alfa Products, Dativers, Mass. 01923.

A suitable temperature can range from about 25° C. to about 150° C., preferably from about 50° C. to about 100° C. A most preferred temperature is 80° C.

Depending on the particular application of the polyurethane to be prepared, certain additives and auxiliary materials may be utilized. For example, flame retardant additives, antiaging additives, pigments, fillers and the like may be utilized to provide the polyurethanes with additional desired characteristics. In addition, crosslinking agents and/or chain extenders may be utilized to influence the end properties of the polyurethane, in particular the hard segment/soft segment relation. For example, to prepare elastomeric polyurethanes for use in film applications, a chain extender such as 1,4-butanediol can be utilized. For examples of suitable additives and auxiliary agents, see generally, Polyurethane Handbook, Ed. G. Oertel, Hamser Publishers, N.Y., distributed by Macmillan Publishing Company, N.Y., which is incorporated herein by reference.

EXAMPLE 21

Polyurethane films were prepared, according to the following procedure, and the stress-strain and hardness properties were determined. Polyols were prepared according to the procedure of Example 17. Polyol A had an equivalent weight of 1351 and Fn of 3.7. Fn as utilized herein refers to the number average functionality and is determined, according to ASTM E-222-73 Method B (reflux method), by acetylating the polyol utilizing a solution of acetic anhydride and perchloric acid in 1,2-dichloroethane. The number average functionality can also be determined utilizing ASTM-E-222-73 Method C. Polyols B, C, D and E had equivalent weights of 2000, 1000, 1667 and 1282, respectively, and an Fn of 2.5, 5.0, 3.0 and 3.9, respectively. The 1,4-butanediol was obtained from GAF Corporation and was dried over 4Å molecular sieves. The 4,4'-methylene bis(cyclohexylisocyanate) was obtained from Mobay Chemical Co. (sold as Desmodur W) and was used as received. The isocyanate number was determined by the di-n-butyl amine method (ASTM D-1638-74).

In each case, the quantities of components are listed in Table 3. The indicated amount of the isocyanate was dissolved in 50 ml of m-xylene 24 hours prior to use. This solution was added to a solution of the indicated amounts of polyol, 1,4-butanediol and dibutyltin dilaurate in 50 ml of m-xylene. (The dibutyltin dilaurate catalyst was added to the polyol/butanediol solution after complete dissolution of the polyol and butanediol.) The polyol/isocyanate solution was then vigorously mixed at room temperature for about one minute. The solution was then poured into a teflon lined pan with dimensions 5.5×3.9×0.04 inches and placed in a vacuum oven at 50° C. for 16 hours. The samples were then removed from the vacuum oven and placed into a standard oven at 95° C. for 10-12 hours. The thickness of the film varied from about 0.01 to about 0.025 inches, depending on the percent solids of the polymer solution. The chemical structure of the films was studied by IR spectroscopy. In all cases, a strong carbonyl urethane group absorption at 1720 $cm^{-1}$ was observed. The isocyanate adsorption at 2270 $cm^{-1}$ was not observed or was very weak, indicating that there was an essentially complete reaction. The stress-strain properties were measured according to ASTM D-410 (utilizing a Universal Instron Tester) and the hardness (Shore A) was measured according to ASTM D-2240. Results are reported in Table 3.

TABLE 3

| Entry No. | Polyol (wt. %)[a] | wt. % Butanediol | wt. % Catalyst | wt. % Diisocyanate | % Solids | Ultimate Strength (psi) | Elongation at Break (%) | Hardness (Shore A) | Modulus (psi) 100%/200% |
|---|---|---|---|---|---|---|---|---|---|
| 1 | A (2.7) | — | 0.03 | 0.3 | 6.4 | 327 | 436 | 48 | 33/41 |
| 2 | A (2.7)[b] | 0.1 | 0.06 | 0.5 | 7.1 | 1249 | 269 | 72 | 351/396 |
| 3 | A (2.7) | 0.2 | 0.09 | 0.8 | 7.8 | 1434 | 190 | 78 | 634/729 |
| 4 | B (3.0)[b] | 0.1 | 0.03 | 0.4 | 6.6 | 666 | 179 | 69 | — |
| 5 | B (1.5) | 0.1 | 0.09 | 0.4 | 7.0 | 1028 | 615 | 70 | — |
| 6 | B (3.4) | — | 0.03 | 0.2 | 7.1 | 220 | 331 | 62 | — |
| 7 | B (1.5) | 0.04 | 0.06 | 0.2 | 3.1 | 666 | 179 | 69 | — |
| 8 | B (1.4) | 0.06 | 0.03 | 0.3 | — | 890 | 259 | 69 | — |
| 9 | C (1.6) | 0.4 | 0.05 | 0.3 | 3.8 | 1859 | 397 | — | 375/371 |
| 10 | D (2.9) | — | 0.03 | 0.2 | 6.2 | 378 | 275 | — | 116/120 |
| 11 | D (4.7) | 0.1 | 0.06 | 0.8 | 8.7 | 513 | 209 | — | 220/217 |
| 12 | D (4.0) | 0.2 | 0.08 | 1.0 | 8.1 | 1278 | 190 | — | 636/— |
| 13 | D (3.6) | 0.3 | 0.09 | 1.2 | 8.4 | 2332 | 166 | — | 1279/— |
| 14 | E (3.1) | — | 0.03 | 0.3 | 6.8 | 353 | 339 | — | 78/84 |
| 15 | E (3.1) | 0.1 | 0.06 | 0.6 | 7.3 | 1415 | 385 | — | 303/302 |
| 16 | E (3.0) | 0.2 | 0.08 | 0.9 | 7.9 | 2528 | 299 | — | 791/699 |
| 17 | E (3.0) | 0.3 | 0.09 | 1.1 | 8.2 | 2688 | 179 | — | 1244/— |

[a]Wt. % is expressed as the percent by weight based on the total weight of the formulation.
[b]Contains 0.76 wt. % PTMO-2000, a poly(oxytetramethylene)glycol (EW of 1000, Fn = 2) obtained from E. I. duPont de Nemours.

COMPARATIVE EXAMPLE

Following the procedure set forth in Example 20, polyurethane films were prepared from commercially available polyols and the stress-strain and hardness properties were determined. In each case, the quantities of components are listed in Table 4. The chemical structure of the films and the stress-strain and hardness properties were determined as in Example 20.

TABLE 4

| Entry No. | Polyol (wt. %) | Wt. % Butanediol | Wt. % Catalyst | Wt. % Diisocyanate | % Solids | Ultimate Strength (psi) | Elongation at Break (%) | Hardness (Shore A) | Molulus (psi) 100%/200% |
|---|---|---|---|---|---|---|---|---|---|
| 1 | H[a] (3.0) | — | 0.03 | 0.3 | 6.6 | 310 | 150 | — | — |
| 2 | H (2.7) | 0.1 | 0.06 | 0.6 | 7.3 | 425 | 238 | 65 | 149/89 |
| 3 | I[b] (1.5) | 0.1 | 0.03 | 0.4 | 6.7 | 587 | 1092 | 64 | — |
| 4 | I (3.0) | 0.3 | 0.08 | 1.2 | 7.9 | 4589 | 408 | — | 520/597 |

[a]Polyol H is a polyol butadiene resin (EW 1203.9, Fn = 2.3) purchased from Sartomer Chemical as R-45HT.
[b]Polyol I is a poly(oxytetramethylene)glycol (EW 1000, Fn = 2) purchased from DuPont as PTMO-2000.

EXAMPLE 22

Polyurethane films were prepared, according to the procedure of Example 21, and the stress-strain and hardness properties were determined. The polyols were prepared according to the procedure of Example 20. Polyol J had an equivalent weight of 1496 and Fn of 1.6. Polyol K had an equivalent weight of 566 and Fn of 4.2. In each case, the quantities of components are listed in Table 5 along with the stress-strain and hardness properties.

TABLE 5

| Entry No. | Polyol (wt. %)[a] | Wt. % Butanediol | Wt. % Catalyst | Wt. % Diisocyanate | % Solids | Ultimate Strength (psi) | Elongation at Break (%) | Hardness (Shore A) | Molulus (psi) 100%/200% |
|---|---|---|---|---|---|---|---|---|---|
| 1 | J (3.4) | 0.2 | 0.12 | 0.7 | 7.9 | 619 | 97 | 75 | — |
| 2 | J (3.4) | 0.2 | 0.15 | 0.9 | 8.5 | 758 | 174 | 82 | |
| 3 | J (3.5) | 0.3 | 0.18 | 1.3 | 9.4 | 1238 | 154 | 86 | — |
| 4 | K (3.4) | — | 0.06 | 0.8 | 8.0 | 662 | 226 | 82 | |
| 5 | K (3.6) | 0.3 | 0.12 | 1.7 | 10.0 | 1699 | 125 | 95 | |
| 6 | K (3.5) | 0.6 | 0.15 | 2.5 | 11.3 | 2332 | 180 | 98 | |
| 7 | K (3.5) | 0.8 | 0.18 | 3.3 | 12.4 | 2477 | 108 | 99 | |

[a]Wt. % is expressed as the percent by weight based on the total weight of the formulation.

D. Polycarbonate Preparation

Polycarbonates can be prepared by reacting, in a suitable solvent, the above-described polyols with a disubstituted carbonate, e.g., diphenyl carbonate, in the presence of a suitable catalyst, e.g., dibutyltin dilaurate. The reaction is conducted at a temperature of from about 100° C. to about 250° C., preferably at a temperature of from about 190° C. to about 230° C. Suitable solvents include toluene, benzene, metaxylene, chloroform, ortho-dichlorobenzene, chloroform, heptane, tetrahydrofuran and the like. Suitable catalysts include dialkyltin dicarboxylates, e.g., dibutyltin dilaurate; amines, e.g., tetramethylbutane diamine and 1,4-diaza(2,2,2)bicyclooctane; certain other organic metal compounds, e.g., tin octoate; and certain phosphorous compounds such as phospholine oxide and the like.

Mixtures of such catalysts can also be utilized. Disubstituted carbonates suitable for use in the present invention include diphenyl carbonate, dialkylcarbonates such as dimethylcarbonate, and the like. Such polycarbonates can also contain certain additives and auxiliary materials as described above.

EXAMPLE 23

1.3 gm of EPDM polyol (5000 Mw, 3.0 hydroxyl groups/chain, 0.8 mmol hydroxyl groups) was dissolved in 10 mL of tetrahydrofuran in a 100 mL round bottom flask. 100 mg (0.47 mmol) of diphenyl carbonate and 20 mg (0.03 mmol) of dibutyltin dilaurate was added to the solution. The solvents were then removed in vacuo and the neat polymer solution was heated to 200° C. for 2 hours under an argon atmosphere. The new material, which had a foamlike structure was washed with tetrahydrofuran and dried in vacuo. FTIR of the new polymer lacked the absorbances for the hydroxyl groups present in the starting polymer and displayed the absorbance characteristic for an alkyl carbonate polymer at 1763 $cm^{-1}$.

EXAMPLE 24

2.0 gm of EPDM polyol (5000 Mw, 3.0 hydroxyl groups/chain, 1.2mmol hydroxyl groups) was dissolved in 30 mL of tetrahydrofuran in a 100 mL round bottom flask. 128 mg (0.60 mmol) of diphenyl carbonate and 4mg (0.038 mmol) of sodium carbonate was added to the solution. The solvent was removed in vacuo and the polymer mixture was heated to 220° C. under an argon stream for 2 hours. The cross-linked material was then washed with tetrahydrofuran and dried in vacuo. FTIR of the new polymer lacked the absorbances for the hydroxyl groups present in the-starting polymer and displayed the absorbance characteristic for an alkyl carbonate polymer at 1763 $cm^{-1}$.

E. Polyester Preparation

Polyesters can be prepared by reacting, in a suitable solvent, the above-described polyols with a dicarboxylic acid, and derivatives thereof such as acid chlorides and anhydrides, e.g., methyl terephthalate and phthalic anhydride, in the presence of a suitable catalyst, e.g., triethylamine. The reaction is conducted at a temperature of from about −30° C. to about 230° C., preferably from about 30° C. to about 230° C. Suitable solvents include toluene, benzene, meta-xylene, chloroform, ortho-dichlorobenzene, chloroform, heptane, tetrahydrofuran and the like. Suitable catalysts include a variety of acids, bases and transition metal complexes. Examples of suitable bases include triethylamine, pyridine, 1,1'-carbonyldiimidazole as well as other known tertiary amine bases. Examples of suitable acids include p-toluenesulfonic acid and the like. Examples of transition metal complexes include tin compounds such as $Sn(CO_2)_2$, $(Butyl)_2SnO$ and titanium or zirconium alkoxides, for example, $Ti(O\text{-}n\text{-}butyl)_4$. Suitable dicarboxylic acids include methyl terephthalate, terephthalic acid, adipic acid and the like, including the acid chloride derivatives thereof. Suitable anhydrides include phthalic anhydride, maleic anhydride, succinic anhydride and malonic anhydride. Polyesters as described can also contain additives and auxiliary materials as described above.

EXAMPLE 25

1.15 cjm of EPDM polyol (5000)Mw, 3.0 hydroxyl groups/chain, 0.704 mmol hydroxyl groups) was dissolved in 10 mL of toluene in a 100 mL round bottom flask. In a separate 100 mL round bottom flask, 0.5 equivalents of terephthaloyl chloride (0.082 gm, 0.4 mmol) were weighed out and dissolved in 10 mL of toluene. 0.1 mL of triethylamine were added to the polymer solution. The terephthaloyl chloride solution was slowly added to the polymer solute. On with rapid stirring. The solution became cloudy. The flask was fitted with a condenser and a nitrogen bubbler. The solution was heated to reflux and allowed to reflux for 10 minutes then cooled to room temperature. Solvents were removed in vacuo. The cross-linked, rubbery material was washed with toluene. FTIR of the neat material shows peaks at 1781 $cm^{-1}$ and 1728 $cm^{-1}$ corresponding to the ester groups of an alkyl polyester. No peaks above 3100 $cm^{-1}$ were present to indicate unreacted hydroxyl groups were left.

EXAMPLE 26

1.06 gm of EPDM polyol (5000 Mw, 3.0 hydroxyl groups/chain, 0.649 mmol hydroxyl groups) was dissolved in 10 mL of tetrahydrofuran in a 100 mL round bottom flask. In a separate 100 mL round bottom flask, 0.5 equivalents of terephthaloyl chloride (0.066 gm, 0.324 mmol) were weighed out and dissolved in 10 mL of tetrahydrofuran. 0.053 mL of pyridine (0.65 mmol) were added to the polymer solution. The terephthaloyl chloride solution was slowly added to the polymer solution with rapid stirring. The solution became cloudy. The flask was fitted with a condenser and a nitrogen bubbler. The solution was heated to reflux and allowed to reflux for 1 hour then cooled to room temperature. Solvents were removed in vacuo. The cross-linked, rubbery material was washed with tetrahydrofuran. FTIR of the neat material shows peaks at 1778 $cm^{-1}$ and 1728 $cm^{-1}$ corresponding to the ester groups of an alkyl polyester. No peaks above 3100 $cm^{-1}$ were present to indicate unreacted hydroxyl groups were left.

What is claimed is:

1. Composition comprising a polymer prepared by reacting a polyol having, per polymer molecule, at least one repeat unit of the formula:

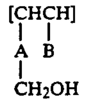

said polyol further having repeat units containing residual carbon-carbon double bonds; wherein A is absent or represents a radical derived from a pendant unsaturated hydrocarbon portion of a monomer of the polymer molecule and B represents hydrogen or together with A represents a radical derived from a pendant portion of an unsaturated monocyclic, bicyclic or tricyclic hydrocarbon, and wherein said polyol is derived from a hydroformylated polyolefin wherein said polyolefin has a level of unsaturation of from one C═C per polymer molecule to about one C═C per 4 carbon atoms prior to hydroformylation of said polyolefin, with a compound selected from the group consisting of dicarbonates, dicarboxylic acids, derivatives of dicarboxylic acids, and mixtures thereof, under suitable reaction conditions in the presence of a suitable catalyst wherein said derivatives of dicarboxylic acids are selected from the group consisting of dicarboxylic acid chlorides and anhydrides.

2. Composition of claim 1 wherein A represents a pendant hydrocarbon portion of a monomer of the polymer molecule and B represents hydrogen.

3. Composition of claim 1 wherein A is absent and B is hydrogen.

4. Composition of claim 2 wherein said pendant hydrocarbon portion of the polymer is a pendant group having from 2 to about 8 carbon atoms.

5. Composition of claim 1 wherein B, together with A, represents a pendant portion of a radical selected from the group consisting of ethylnorbornane, dicyclopentane, cyclooctane, 5-ethylnorbornane, 5-methylnorbornane, 5-isopropylnorbornane, 2-methyl-bicyclo(4.3.0)nonane, 5-methyl-bicyclo(4.3.0)nonane, 5,6-dimethyl-bicyclo(4.3.0)nonane, and bicyclo(3.2.0)heptane.

6. Composition of claim 1 wherein the polyol is reacted with a disubstituted carbonate.

7. Composition of claim 6 wherein said disubstituted carbonate is selected from the group consisting of diphenyl carbonate and dimethyl carbonate.

8. Composition of claim 1 wherein the polyol is reacted with a dicarboxylic acid or a derivative of a dicarboxylic acid.

9. Composition of claim 8 wherein said dicarboxylic acid is selected from the group consisting of terephthalic acid, adipic acid and methyl terephthalate, and said derivative of dicarboxylic acid is selected from the group consisting of the acid chloride derivatives of terephthalic acid, adipic acid and methyl terephthalate, phthalic anhydride, maleic anhydride, succinic anhydride and malonic anhydride.

10. Composition comprising an adduct obtained by sequentially hydroformylating an olefinic polymer containing a level of unsaturation of from one C═C per polymer molecule to about one C═C per 4 carbon atoms under conditions which produce an aldehyde-containing polymer containing residual carbon-carbon double bonds and essentially free of hydroxyl groups, then subjecting said aldehyde-containing polymer to reduction conditions to produce a polyol containing residual carbon-carbon double bonds, and then reacting said polyol under suitable reaction conditions with a compound selected from the group consisting of dicarbonates, dicarboxylic acids, derivatives of dicarboxylic acids, and mixtures thereof wherein said derivatives of dicarboxylic acids are selected from the group consisting of dicarboxylic acid chlorides and anhydrides.

11. Composition of claim 10 wherein the polyol is reacted with a disubstituted carbonate.

12. Composition of claim 11 wherein said disubstituted carbonate is selected from the group consisting of diphenyl carbonate and dimethyl carbonate.

13. Composition of claim 10 wherein the polyol is reacted with a dicarboxylic acid or a derivative of a dicarboxylic acid.

14. Composition of claim 13 wherein said dicarboxylic acid is selected from the group consisting of terephthalic acid, adipic acid and methyl terephthalate, and said derivative of dicarboxylic acid is selected from the group consisting of the acid chloride derivatives of terephthalic acid, adipic acid and methyl terephthalate, phthalic anhydride, maleic anhydride, succinic anhydride and malonic anhydride.

15. Method of preparing polymers comprising hydroformylating an olefinic polymer containing level of unsaturation of from one C═C per polymer molecule to about one C═C per 4 carbon atoms under conditions which produce and aldehyde-containing polymer containing residual carbon-carbon double bonds and essentially free of hydroxyl groups, then subjecting said aldehyde-containing polymer to reduction conditions to produce a polyol containing residual carbon-carbon double bonds, and then reacting said polyol under suitable reaction conditions with a compound selected from the group consisting of dicarbonates, dicarboxylic acids, derivatives of dicarboxylic acids and mixtures thereof wherein said derivatives of dicarboxylic acids are selected from the group consisting of dicarboxylic acid chlorides and anhydrides.

16. Method of claim 15 wherein the polyol is reacted with a diisocyanate.

17. Method of claim 16 wherein said diisocyanate is selected from the group consisting of toluenediisocyanate, 4,4-benzidenediisocyanate, 1,5-naphthalenediisocyanate, diphenylmethane-diisocyante, 4,4'-methylene bis(cyclohexylisocyanate).

18. Method of claim 15 wherein the polyol is reacted with a disubstituted carbonate.

19. Method of claim 18 wherein said disubstituted carbonate is selected from the group consisting of diphenyl carbonate and dimethyl carbonate.

20. Method of claim 15 wherein the polyol is reacted with a dicarboxylic acid or a derivative of dicarboxylic acid.

21. Method of claim 20 wherein said dicarboxylic acid is selected from the group consisting of terephthalic acid, adipic acid and methyl terephthalate, and said derivative of dicarboxylic acid is selected from the group consisting of the acid chloride derivatives of terephthalic acid, adipic acid and methyl terephthalate, phthalic anhydride, maleic anhydride, succinic anhydride and malonic anhydride.

* * * * *